United States Patent [19]

Kobayashi

[11] Patent Number: 4,717,793

[45] Date of Patent: Jan. 5, 1988

[54] GRAPHIC INPUT DEVICE

[75] Inventor: Tadashi Kobayashi, Tokyo, Japan

[73] Assignee: NEC Corporation, Japan

[21] Appl. No.: 821,159

[22] Filed: Jan. 21, 1986

[30] Foreign Application Priority Data

Jan. 22, 1985 [JP] Japan .................................. 60-9466

[51] Int. Cl.⁴ ........................................... G08C 21/00
[52] U.S. Cl. ......................................... 178/18; 178/19
[58] Field of Search ................... 178/18, 19; 364/520, 364/571

[56] References Cited

U.S. PATENT DOCUMENTS

| | | | |
|---|---|---|---|
| 4,477,877 | 10/1984 | Nakamura et al. | 178/19 X |
| 4,568,799 | 2/1986 | Kobayashi et al. | 178/19 X |
| 4,577,057 | 3/1986 | Blesser | 178/19 X |

*Primary Examiner*—Stafford D. Schreyer

*Attorney, Agent, or Firm*—Laff, Whitesel, Conte & Saret

[57] ABSTRACT

A graphic input device has a tablet surface with two groups of conductor loops orthogonally arranged below an input surface. These conductors are scanned sequentially to detect an inductive coupling with a winding in a stylus or pen which is writing on the surface, the coupling resulting from sequentially energizing said loops by a carrier wave. The detected signals are then read out in terms of the coordinates of locations on the surface where writing occurs. The output of the detector is clipped at a level which leaves the true signal that identifies the location, but which eliminates false signals that occur because the stylus or pen is tipped off perpendicular when the writing occurs. The signals picked up by the pen or stylus are mixed with the carrier signals which are applied to the conductor loop. The false signals caused by a tipped stylus cancel each other during such mixing.

11 Claims, 20 Drawing Figures

FIG. 16

GRAPHIC INPUT DEVICE

BACKGROUND OF THE INVENTION

The present invention relates to a graphic input device and, more particularly, to a graphic input device of the type using conductor loop groups orthogonally arranged on an input surface of a tablet and a stylus or pen having a winding therein. This type of device senses a location where the winding in the stylus or pen is electromagnetically coupled with the conductor loop groups so as to generate an electrical signal which is representative of coordinates of the stylus or pen input position on the tablet surface.

To promote the accuracy of the operation of a graphic input device of the type described, I have described an arrangement which causes electromagnetic coupling to occur between conductor loop groups on an input surface, or a writing surface, and a winding in a stylus or pen. Either the conductor loop groups or the winding is driven by a high frequency carrier, as disclosed in U.S. patent Ser. No. 654,803 now U.S. Pat. No. 4,568,799.

The problem with the prior art graphic input device of the kind described in U.S. patent Ser. No. 654,803 is that, in the case of envelope detection, detection errors are apt to be introduced due to inclinations of the stylus or pen. These errors cannot be eliminated unless the inclinations of the stylus or pen are confined into an impractically narrow range. In the case of synchronous detection, the size of the circuit becomes undesirably large, adding to the dimensions and cost of the whole device.

SUMMARY OF THE INVENTION

It is, therefore, an object of the present invention to provide a graphic input device which adopts envelope detection and, yet, which accommodates a wider range of stylus or pen inclinations, without increasing the dimensions and cost of the device.

In accordance with one aspect of the present invention, a graphic input device has a tablet in which two groups of conductor loops are orthogonally arranged below an input surface. A scanning circuit provides for sequentially scanning each of the conductor loops by applying a scanning signal to each loop. The scanning signal inludes a carrier which generates a magnetic field that travels along an axis of coordinates on the input surface. A stylus or pen, having a winding therein, is moved over the input surface and a first electrical signal is induced when the winding interlinks with the magnetic field resulting from an energization of the loops at the time when data is input into the input surface.

The graphic input device includes a mixer means for mixing, by addition, the first electrical signal and a waveform of the carrier. Filter/amplifier means pass and amplify signal components of an output of the mixer means, which components lie in a predetermined bandwidth, inclusive of a frequency of the carrier. Detector means envelope-detects an output of the filter/amplifier means. Peak detector means clips a waveform of the output of the detector means and then detects a peak of the clipped signal to produce a second electrical signal, which is representative of a time at which the peak appears. Means is further provided for generating a coordinates signal which is indicative of a location of data input and which is responsive to a difference in time between the second electrical signal and a pulse signal representative of an origin of an axis of coordinates.

In accordance with another aspect of the present invention, a graphic input device has a stylus or pen in which a winding is installed for developing a magnetic field responsive to a carrier applied to the winding. A tablet contains two groups of conductor loops which are orthogonally arranged below an input surface. A scanning circuit is provided for scanning each one of the two conductor loop groups and for delivering a first electrical signal which is induced in the conductor loop group responsive to the magnetic field which is applied at a time when data is input into the input surface.

The graphic input device includes a mixer means for mixing, by addition, a waveform of the first electrical signal and a waveform of the carrier. Filter/amplifier means passes and amplifies signal components of an output of the mixer means which lie in a predetermined bandwidth which includes the frequency of the carrier. Detector means envelope-detects an output of the filter/amplifier means. Peak detector means detects a waveform of an output of the detector means and then detects a peak of the clipped signal to produce a second electrical signal which is representative of a time at which the peak has appeared. Means is further provided for generating a coordinates signal which is indicative of a location of data input responsive to a difference in time between the second electrical signal and a pulse signal which is representative of an origin of an axis of coordinates.

BRIEF DESCRIPTION OF THE DRAWINGS

The features and advantages of the present invention will become more apparent from the following detailed description taken in conjunction with the accompanying drawings, in which.

DESCRIPTION OF THE PREFERRED EMBODIMENTS

Figure 1:
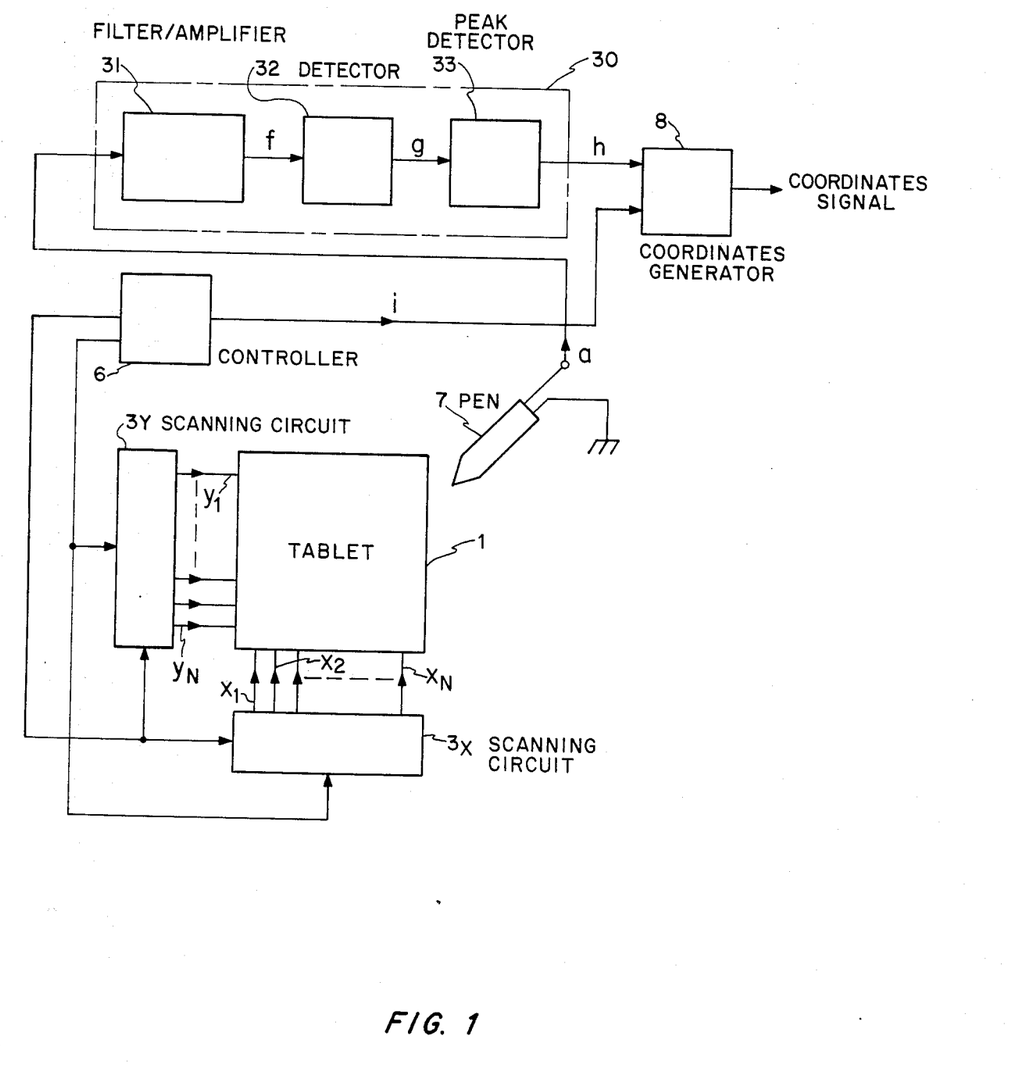
FIG. 1 is a block diagram of a prior art graphic input device.
Figure 2:
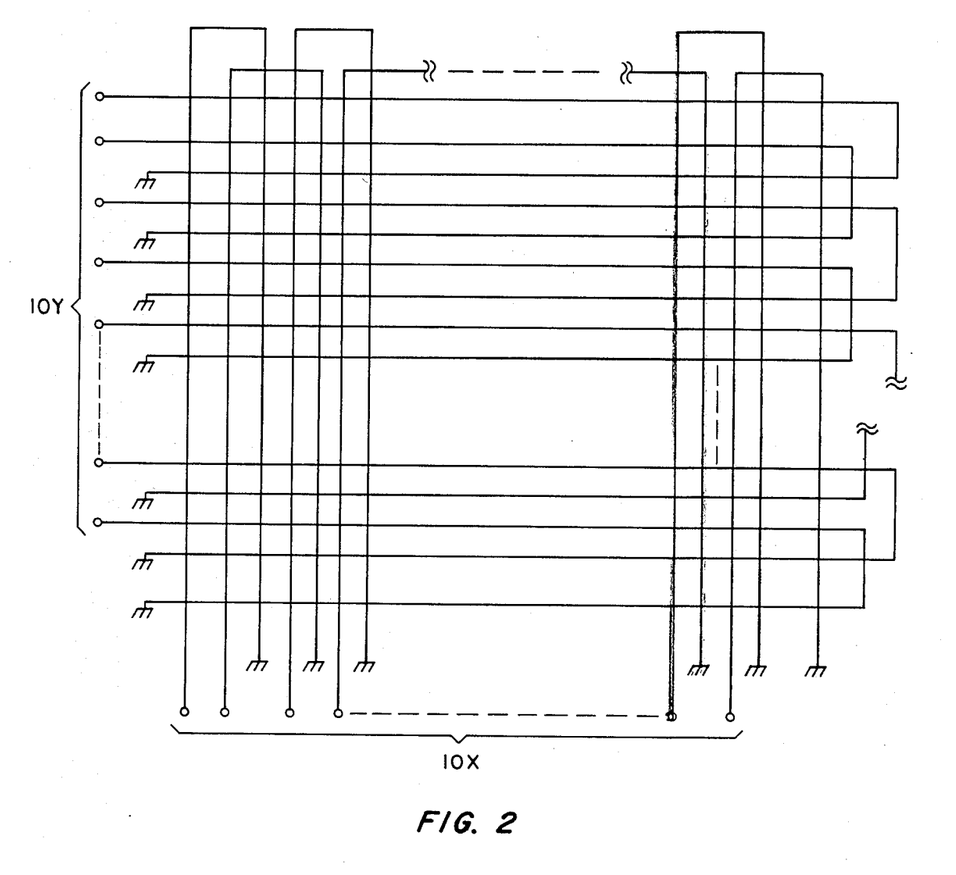
FIG. 2 is a plan view of two discrete groups of conductor loops which are orthogonally arranged in a tablet of the device shown in FIG. 1.

FIG. 1 shows the graphic input device disclosed in U.S. patent Ser. No. 654,803. Two discrete groups of conductor loops are orthogonally arranged on an input surface of a tablet 1, the two groups being perpendicular to each other. Specifically, as shown in FIG. 2, the conductor loop groups comprise a conductor loop group 10X and a conductor loop group 10Y. The conductor loop group 10X is interconnected with a scanning circuit 3X (FIG. 1) which is supplied with high frequency burst signals $x_1-x_N$. The conductor loop group 10Y is interconnected with a scanning circuit 3Y which is supplied with high frequency burst signals $y_1-y_N$. The burst signals $x_1-x_N$ and $y_1-y_N$ alternate with each other under the control of a control circuit 6.

Figure 3:
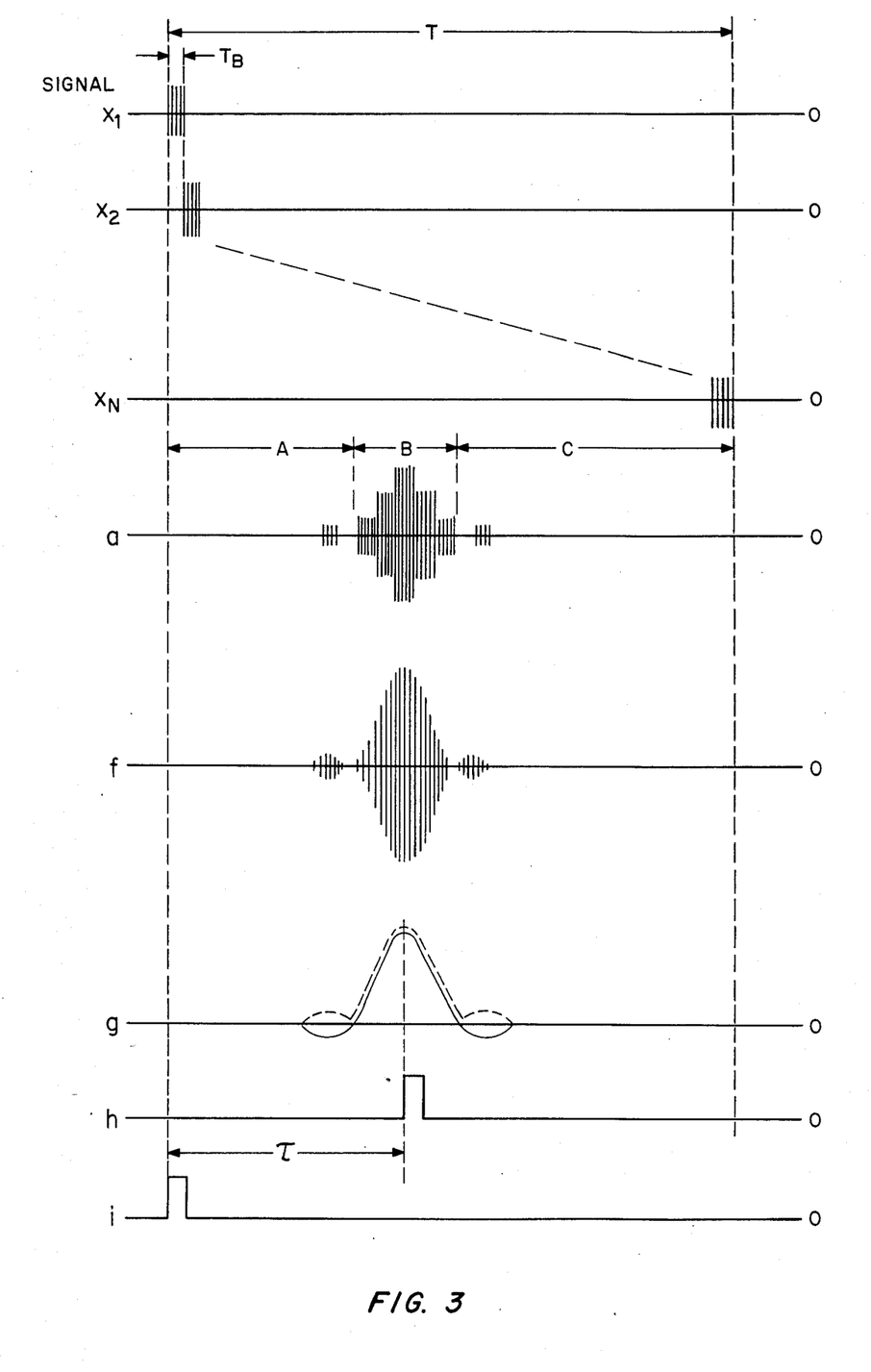
FIG. 3 is a timing diagram demonstrating the operation of the device of FIG. 1.

As shown in a timing diagram in FIG. 3, during X scanning, the burst signals $x_1-x_N$ are sequentially applied to the conductor loop group 10X so that the location on the writing surface of the tablet 1 where a magnetic field develops is sequentially shifted along the X axis. That is, a traveling magnetic field develops along the X axis.

At the instant of data input, a winding in a stylus or pen 7 interlinks with the traveling magnetic field with the result that a signal a is induced in the stylus winding with a voltage which corresponds to a variation in the field intensity. As long as the axis of the winding 7 is perpendicular to the writing surface of the tablet 1, the waveform of the signal a remains symmetrical as shown in FIG. 3; the highest peak (major peak) being developed by a magnetic field associated with a particular conductor loop which is located immediately below the winding 7.

The signal a (FIG. 3) is shown as involving portions A and C, each of which is generated by magnetic fields which interlink with the winding 7, these fields extending from conductor loops which are remote from the writing position. A portion B, of signal a, is generated by magnetic fields which interlink with the winding 7 extending from conductor loops which are closest to the writing position. The signal portion B is opposite in phase to the signal portions A and C because, among the magnetic fields which interlink with the winding 7, those which are close to the winding 7 are opposite in polarity to those which are remote from the same.

The output a of the stylus or pen 7 is applied to a detection circuit 30 (FIG. 1) which is made up of a filter/amplifier 31, a detector 32 and a peak detector 33. The filter/amplifier 31 suppresses and amplifies side band components of the signal a, which correspond to the burst frequency. The detector 32 subjects an output f (FIG. 3) of the detector 32 to envelope detection or synchronous detection, thereby producing an output signal g. This signal g will have a waveform, as indicated by a solid line in FIG. 3, if the detector 32 is a synchronous detector and a waveform, as indicated by a dashed or phantom line if it is an envelope detector. The peak detector 33 detects a peak of the signal g and produces a pulse h which is representative of the timing of the detected peak. The pulse h is routed to a coordinates generator 8.

The controller 6 applies a pulse signal i which is associated with the origin of each axis. The coordinates generator 8, therefore, generates a digital signal having a value which is proportional to a time interval (FIG. 3) between the pulses h and i. The digital signal output of the coordinates generator 8 (FIG. 1) is fed out as a coordinates signal. Since the time interval between the pulses i and h is proportional to the coordinates value of a writing position, the coordinates signal is a digital signal which is proportional to the input coordinates value.

Figure 4:
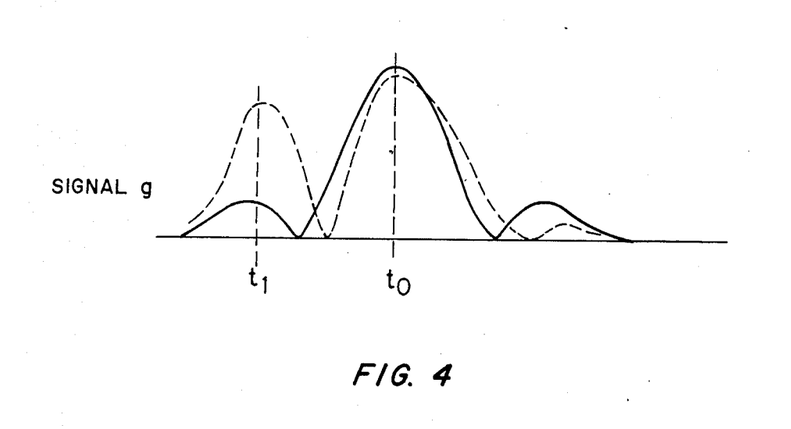
FIG. 4 shows different waveforms of a signal which is the output of a detector of the device shown in FIG. 1.

Assume that the detector 32 of the prior art graphic input device of FIG. 1 is implemented by an envelope detector. Then, so long as the stylus or pen 7 is held perpendicularly to the writing surface of the tablet 1, the detected signal g has a waveform which remains substantially symmetrical as represented by a solid curve in FIG. 4. However, as the stylus or pen 7 is tilted, the winding thereof is also tilted to change the coupling of the magnetic fields to the conductor loops. Specifically, the magnetic fields extending from those conductor loops toward which the winding is tilted affect the winding more intensely to deprive the signal g (FIG. 3) of its symmetry, as indicated by a dashed line of phantom curve in FIG. 4. In this situation, the peak detector 33 will detect the peak at a time $t_1$ which is different from the major peak, this bringing about coordinates detection errors.

A synchronous detector which is another possible implementation for the detector 32 is free from coordinates detection errors because those peaks which appear before and after the major peak are opposite in polarity to the major peak. However, just as it solves the detection error problem, it gives rise to various other problems in the aspect of architecture. Specifically, a synchronous detector is larger in scale than an envelope detector. Moreover, a synchronous detector needs to have appropriate circuit means, such as a phase locked loop, for generating a carrier for demodulation. The carrier of the phase locked loop has to have the same in-phase as the carrier component of the signal f to prevent waveform distortions due to phase shift and fluctuation of a carrier component which take place in the filter/amplifier 31. These distortions occur after a synchronous detection.

Figure 5:
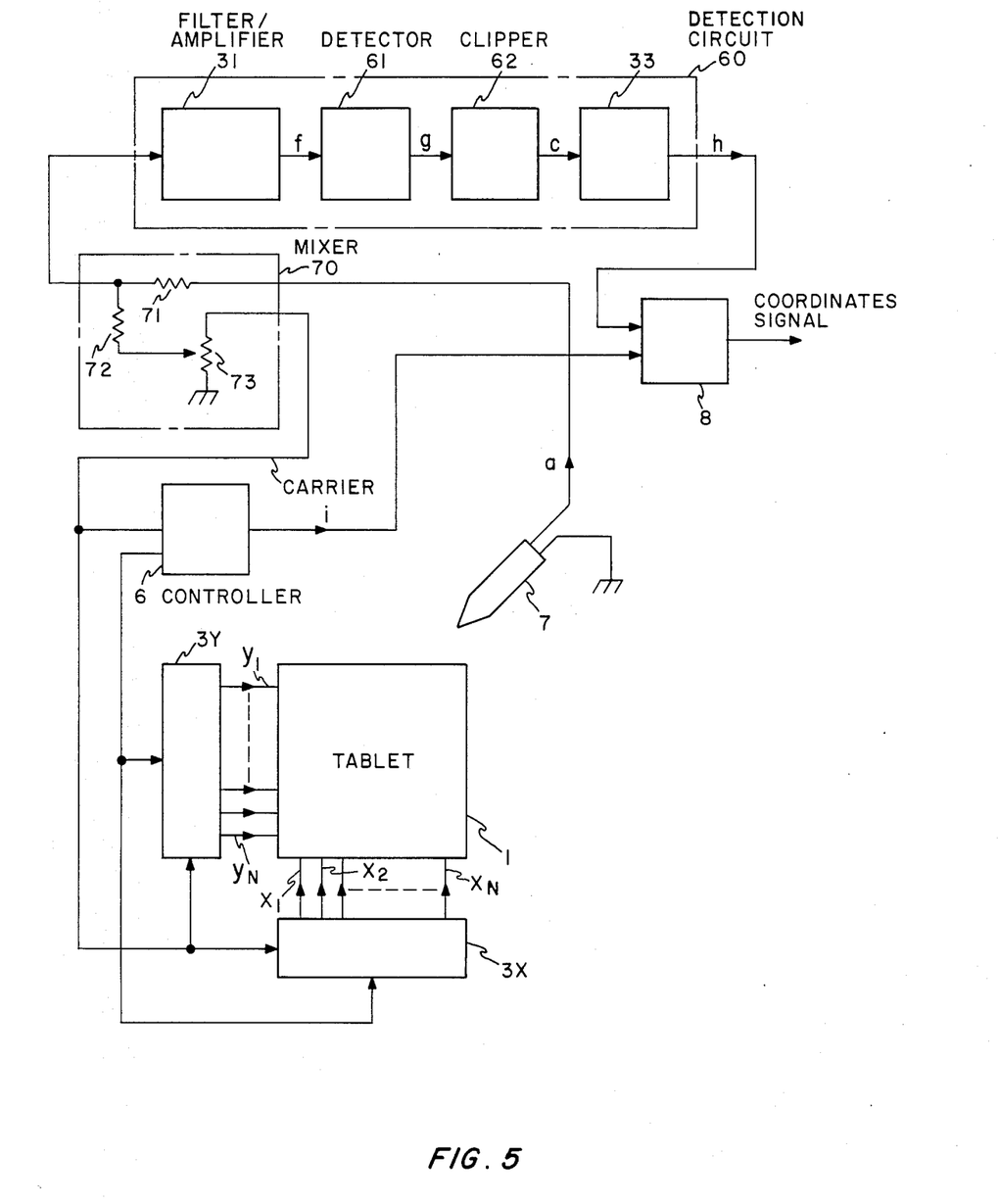
FIG. 5 is a block diagram of a graphic input device embodying the present invention.

FIG. 5 shows a graphic input device embodying the present invention. The device in this particular embodiment is distinguished from the prior art device, which has been discussed with reference to FIG. 1, in that a mixer 70 is additionally included and in that a detection circuit 60 has a clipper 62 connected in series to an output terminal of a detector 61. Detector 61 is substituted for the detection circuit 30 of FIG. 1. The detector 61 is adapted for envelope detection.

A control circuit 6 generates a carrier having a frequency of, for example, 455 kilohertz. The carrier is applied to the mixer 70 and to scanning circuits 3X and 3Y. Also, control signals are applied from the control circuit 6 to the scanning circuits 3X and 3Y. These control signals control the timings for distributing the carrier to respective conductor loops of a tablet 1. Further, the controller 6 generates a pulse i at the beginning of each of X and Y scannings and delivers that pulse to a coordinates generator 8 for coordinates detection.

Figure 6:
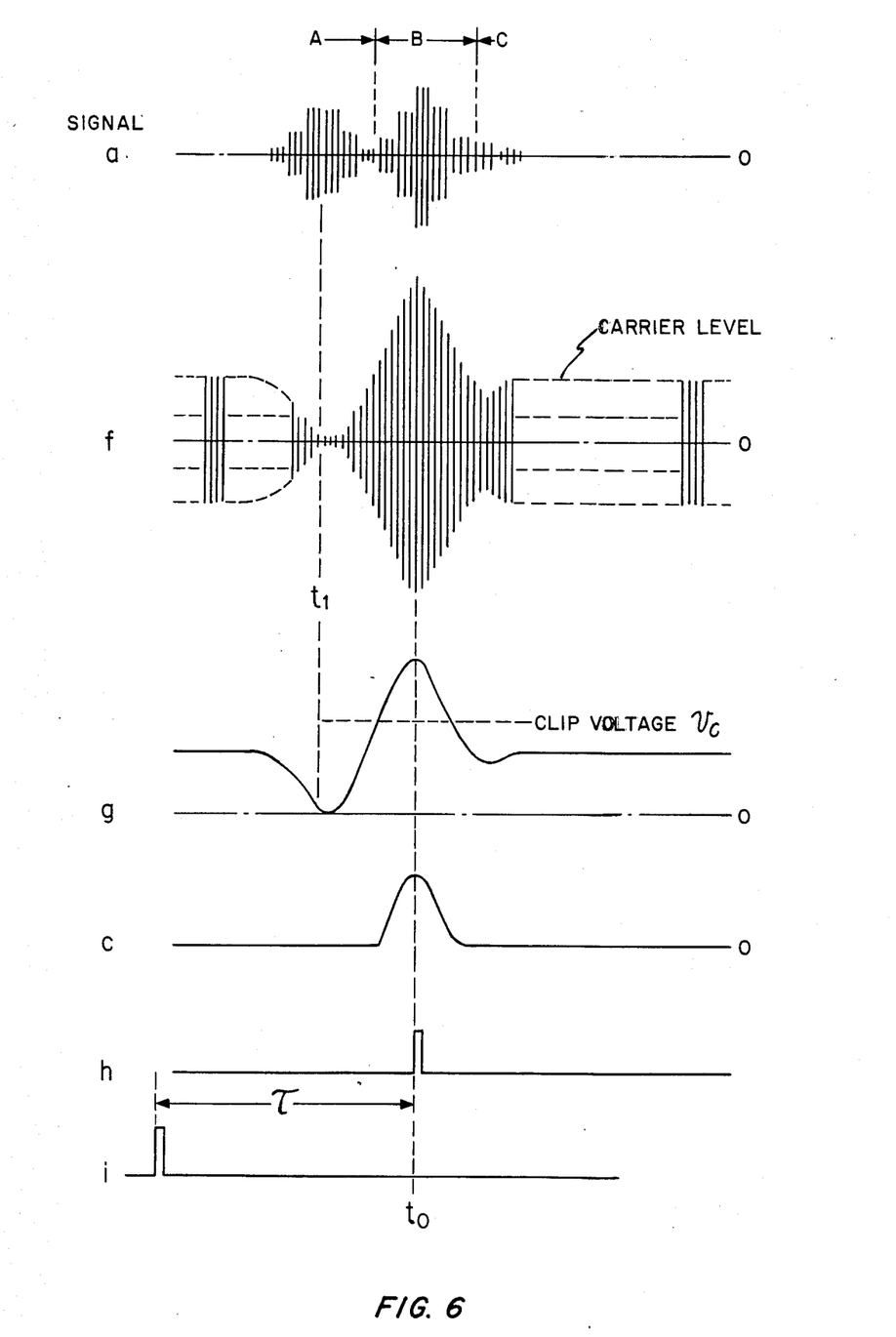
FIG. 6 is a timing diagram representative of the operation of the device shown in FIG. 5.

During an entry of graphical data, a travelling magnetic field on the input surface of the tablet 1 interlinks with a winding which is installed in a stylus or pen 7, thereby inducing a signal a in the winding. At this instant, as the stylus or pen 7 is tilted, the winding is intensely affected by the magnetic fields derived from the conductor loops in the tablet 1, toward which the axis of the winding is inclined. Under this condition, as shown in FIG. 6, a substantial peak develops in a portion A of the signal a. This false peak becomes greater with the increase in the inclination of the winding in the stylus or pen.

In the illustrative embodiment of FIG. 5, the mixer 70 functions such that only the peak which is representative of the true input position of the stylus or pen 7, i.e., the stylus or pen in a portion B of the signal a is detected.

As shown in FIG. 5, the mixer 70 is implemented by an analog adder circuit which is made up of resistors 71 and 72 and a variable resistor 73. The mixer 70 adds a voltage of the signal a to a carrier which is applied thereto from the controller 6, for burst modulation. The mixer 70 gives a sum signal which is routed to a filter-/amplifier 31 of the detection circuit 60.

The winding in the stylus or pen 7 is wound in such a direction that the phase of the carrier which is applied to the mixer 70 is the same as the phase of the portion B of the signal a, but is opposite to the phase of the portions A and C. The mixer 70, therefore, adds the signal a to the carrier in the particular portion B of the signal a which contains the major or true peak, while subtracting the signal a from the carrier in the other portions A and B. The variable resistor 73 in the mixer 70 is adjustable to control the amounts of such addition and subtraction, so that the peaks, other than the major peak, may be sufficiently suppressed.

The filter/amplifier 31 suppresses and amplifies side band components which correspond to the burst frequency components contained in the output signal of the mixer 70. The filtering is accomplished by means of a ceramic filter or filter-like circuit. The output f of the filter/amplifier 31 is applied to the detector 61. Assume that the carrier frequency is $F_O$ and the loop switching frequency is $F_B$ (here, the time assigned to each of the signals $x_1$-$x_N$, or burst length, is assumed to be $T_B$ and the loop switching frequency $F_B$ equal to $1/T_B$). A signal f having a smooth envelope is attainable if the filter 31 is provided with a filtering characteristic which attenuates substantial proportions of those frequency components which lie in the frequency band which is lower than $(F_O - F_B)$ and in the frequency band which is higher than $(F_O + F_B)$. It will be noted that where the frequencies $F_O$ and $F_B$ respectively are 455 kilohertz and 14 kilohertz, desirable pitches of the conductive loops are 5 millimeters.

The envelope detector 61 (FIG. 5) detects the signal f (FIG. 6) and delivers an output g thereof to the clipper 62. The clipper 62 clips the waveform of the signal g using a clip voltage $V_c$ whose level is intermediate between the major peak level and the carrier level, thereby separating only that portion of the signal g which is higher than the clip voltage $V_c$. The output c of the clipper 62 is applied to the peak detector 33. The peak detector 33 generates a pulse signal h which rises timed to the peak of the signal c, i.e., at a time $t_0$. A coordinates detector 8, to which the pulse h and a pulse i representative of an origin are applied, generates a digital signal, the value of which is proportional to the interval between the pulses i and h. The output of the coordinates detector 8 is delivered as a coordinates signal.

As described above, where the sum of the signal a and carrier is subjected to envelope detection, the peaks in the signal g which precede and follow the major peak appear at the opposite side to the major peak with respect to the carrier level. Hence, clipping the signal g fully removes the false peaks before and after the major or true peak. This successfully eliminates a detection error, which are inherent in the envelope detection implemented with the prior art graphic input device. Since the mixer 70 needs only a few resistors and the clipper 62 needs only one resistor and one diode, for example, the device is smaller in size and lower in cost than the device which uses a synchronous detector. Further, since the addition of the signal a and the carrier is effected before they reach the filter/amplifier 31 which entails substantial shifts and variations in phase, there is no need for a PLL or like extra carrier phase synchronizing means which would add to the dimensions and cost of the device.

Figure 7A:
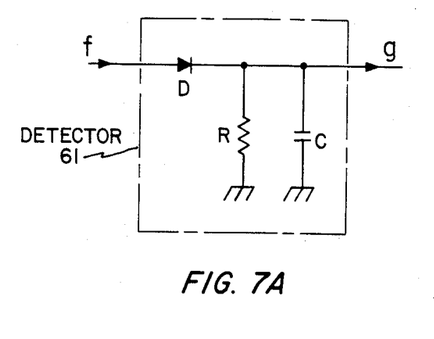
FIGS. 7A and 7B are circuit diagrams, each of which shows a detector which is applicable to the device of FIG. 5.
Figure 7B:
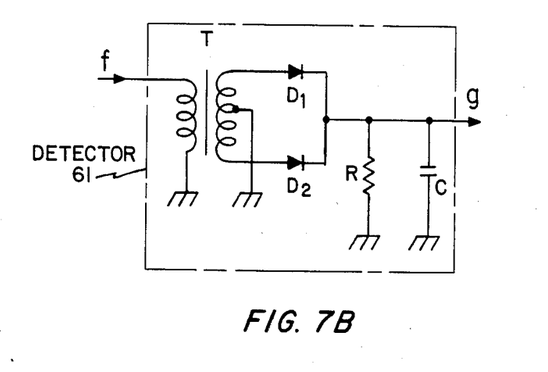

FIGS. 7A and 7B show specific constructions of the detector 61 in accordance with the illustrative embodiment. In FIG. 7A, the detector 61 comprises a half-wave rectification type envelope detector which is constructed such that a diode D half-wave rectifies the input signal f. Then, a resistor R and a capacitor C cooperate to produce an envelope detection signal which has been smoothed along the peaks of the rectified waveform, the smoothed signal being an output signal g. This specific circuit requires a minimum amount of structural elements and, therefore, cuts down the size and cost of the device.

In FIG. 7B, the detector 61 comprises a full-wave rectification type envelope detector. Specifically, a full-wave rectifier is made up of a transformer T and diodes $D_1$ and $D_2$ which full-wave rectify the input signal f. The, the resistor R and capacitor C smooth the output of the rectifier to produce an envelope detection signal as the signal g. The advantage which is attainable with the full-wave rectification scheme is that, since the number of peaks of the rectified waveform per unit time is double the number achievable with the half-wave rectification, the resolution in the peak detection at the peak detector 33 is also doubled.

Figure 8A:
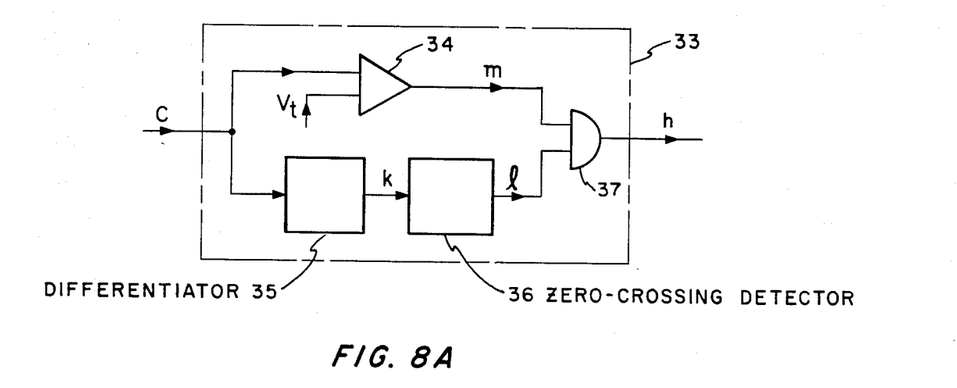
FIG. 8A is a circuit diagram of a peak detector which is also applicable to the device of FIG. 5.
Figure 8B:
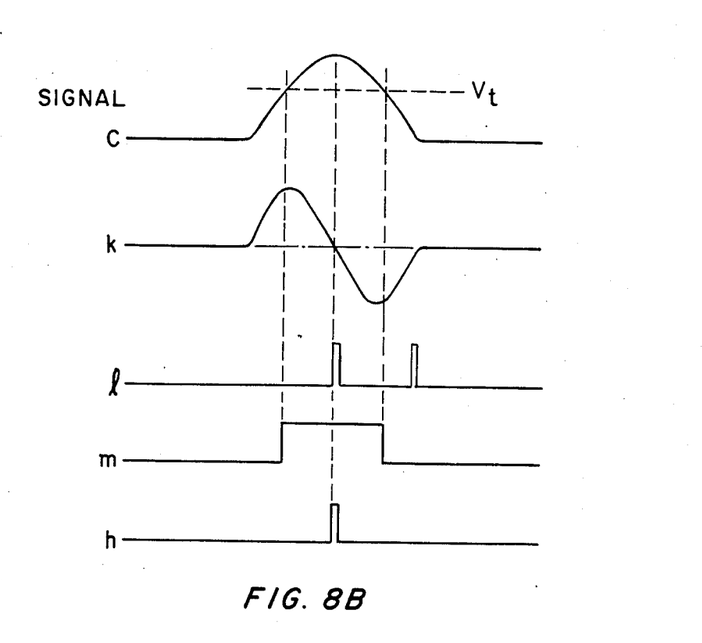
FIG. 8B is a timing diagram showing the operation of the peak detector of FIG. 8A.

FIG. 8A shows a specific construction of the peak detector 33 in a block diagram. The operation of this peak detector 33 is demonstrated in FIG. 8B. As shown, the clipped detection signal c is applied to an amplitude comparator 34 and to a differentiator 35. The differentiator 35 differentiates the waveform of the signal c to produce a signal k which is then applied to a zero-crossing detector 36. The zero-crossing detector 36 generates a signal l which rises everytime the waveform of the signal k crosses the zero level, the signal l being applied to one input terminal of an AND gate 37.

The amplitude comparator 34 generates a signal m which rises only when the voltage of the signal c increases beyond a predetermined threshold voltage $v_t$. The signal m is applied to the other input terminal of the AND gate 37. The AND gate 37 produces a signal h which is the AND function of the signals l and m. Generally, the signal c includes portions, besides the peaks, where the differentiated value becomes zero even under a noiseless condition. Further, externally derived noise and other disturbances would cause the differentiated value to reach zero at the peaks of the noise. The illustrated peak detector 33 is free from such causes of peak detection errors because only those pulses which appear upon the rise of the volate of the signal c beyond the threshold $V_t$ are fed out.

Figure 9:
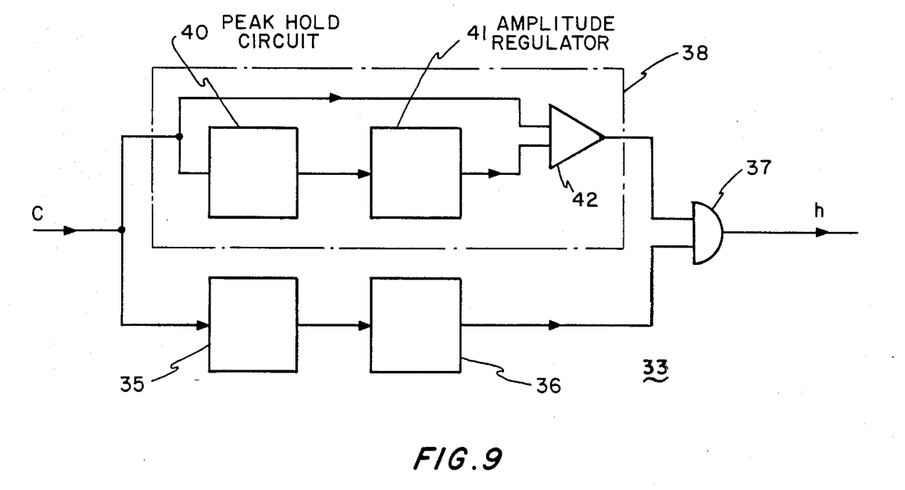
FIG. 9 is a circuit diagram showing an alternative peak detector which is applicable to the device of FIG. 5.

FIG. 9 shows another specific construction of the peak detector 33, in a block diagram form. The peak detector 33 of FIG. 9 is essentially similar to that of FIG. 8A, except that the amplitude comparator 34 is replaced by a comparator 38 having a threshold voltage which is variable in accordance with the peak of the signal c. Specifically, not the predetermined threshold voltage $V_t$, but the signal c, is routed through a peak hold circuit 40 and an amplitude regulator 41 to produce a threshold voltage, which is applied to an amplitude comparator 42. This threshold voltage is a constant multiple of a peak voltage of the signal c. The amplitude comparator 42 generates a pulse signal which rises only when the voltage of the signal c exceeds the threshold voltage.

In this construction of FIG. 9, by suitably selecting a ratio between the threshold voltage and the peak voltage of the signal by means of the amplitude regulator 41, it is possible to accurately detect the peak of the signal c despite any fluctuation in the peak voltage of the signal c.

Figure 10:
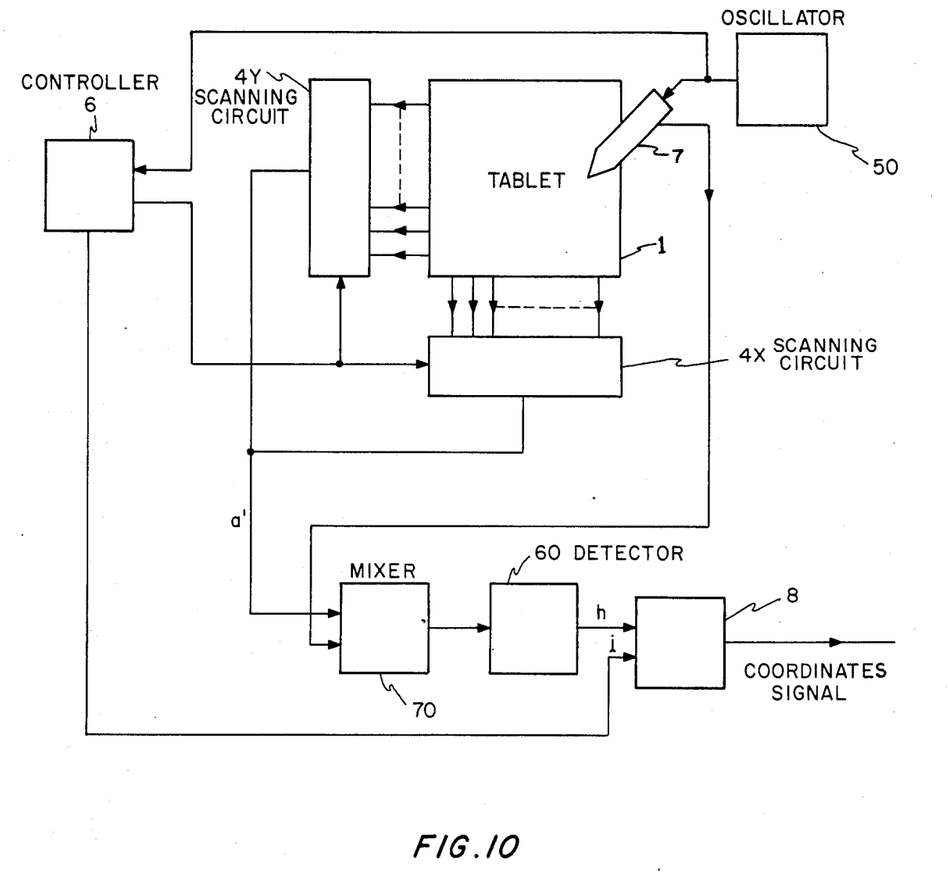
FIG. 10 is a block diagram of another embodiment of the present invention.

FIG. 10 shows another embodiment of the present invention. In this particular embodiment, an oscillator 50 produces a carrier current which is applied to the winding of the stylus or pen 7 to develope an alternating field. At the instand when data is input, voltages induced in the conductor loops of the tablet 1 are picked up via scanning circuits 4X and 4Y to detect the coordinates of the location of the data input.

Figure 11:
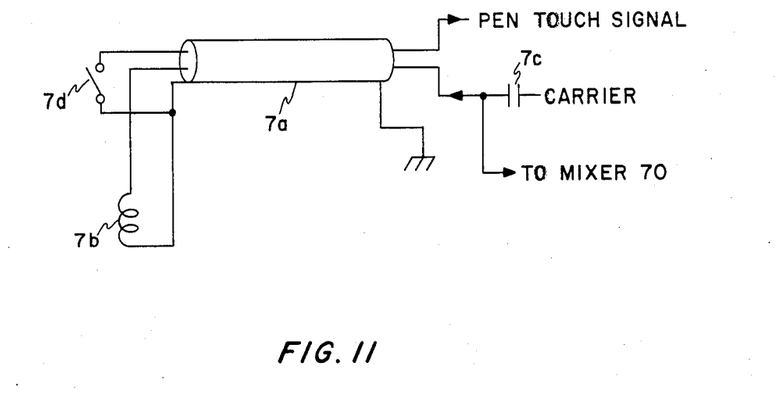
FIG. 11 is a diagram of a circuit which is installed in a stylus or pen in accordance with the embodiment of FIG. 10.
Figure 12:
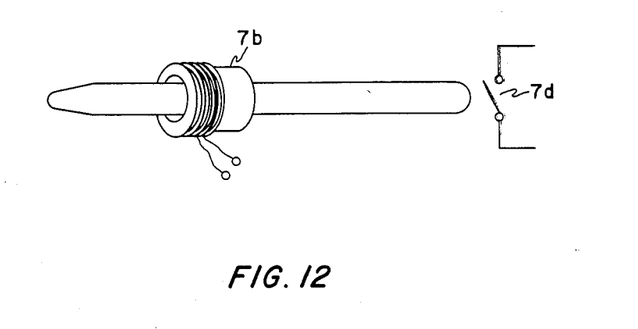
FIG. 12 is a fragmentary detailed side elevation of the stylus or pen which is applicable to the device of FIG. 10.

As shown in FIG. 11, the stylus or pen 7 comprises a coaxial cable 7a to which the carrier from the oscillator 50 is applied, a winding 7b in which a magnetic field is induced by the carrier, a capacitor 7c, and a switch 7d which makes at the instant when the stylus or pen touches the writing surface of tablet 1. The capacitor 7c constitutes a serial resonance circuit, in operation with the winding 7b, and generates a more intense magnetic field than one which would be developed by the winding 7b alone. The current flowing through the resonance circuit is applied to one input of the mixer 70 (FIG. 10). As shown in FIG. 12, the winding 7b inludes a ferrite core and a conductor wound around the ferrite core. A core of the stylus or pen extends throughout and along the axis of the ferrite core. At the instant of data entry, a switch 7d closes to generate a stylus or pen touch signal.

Figure 13A:
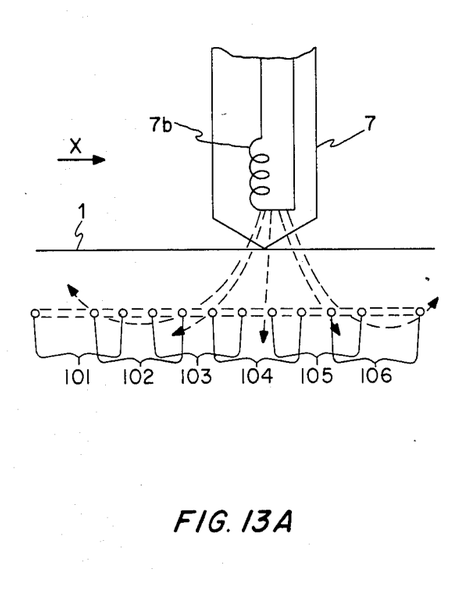
FIGS. 13A and 13B are schematic sections, each showing a specific writing position of the stylus or pen of FIG. 10, relative to a tablet writing surface.

As the carrier current flows through the winding 7b of the stylus or pen 7, the magnetic field included in the winding 7b interlinks with conductor loops 101-106 of the tablet 1, as illustrated in FIG. 13A. While the magnetic field is directed downwardly along the axis of the winding 7b, it interlinks with the conductor loops 103, 104 and 105 from above to below, the conductor loops 101 from below to above, and the conductor loops 102 and 106 substantially parallel to the loop surfaces. As a result, signals through the conductor loops 103, 104 and 105 are opposite in phase to signals through the conductor loops 101, the current flowing through the conductor loops 102 and 106 being relatively small.

Figure 14:
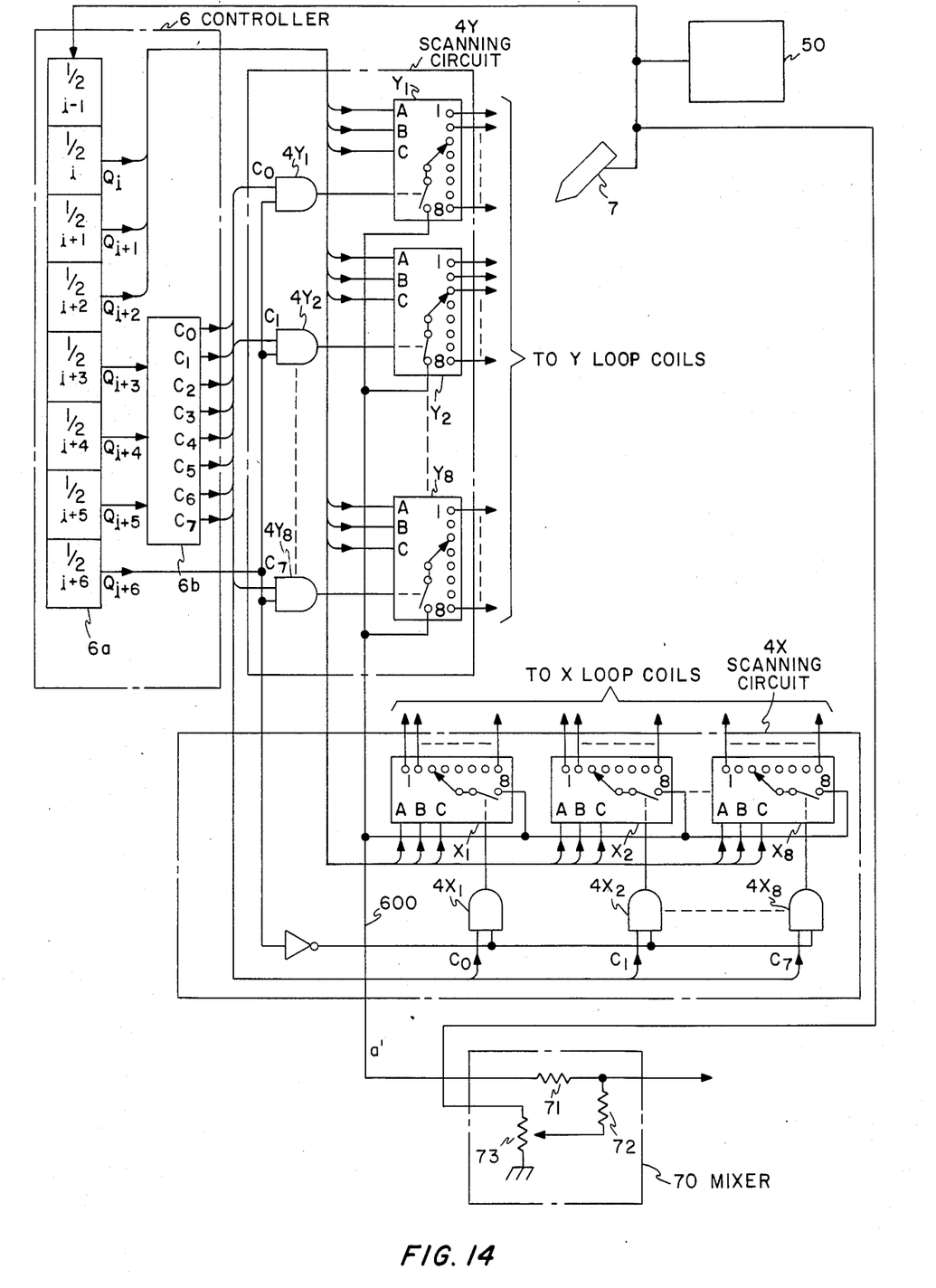
FIG. 14 is a circuit diagram showing details of a part of the device shown in FIG. 10.

FIG. 14 shows, in detail, a part of the device of FIG. 10 which includes the controller 6 and the scanning circuits 4X and 4Y. Assume that the scanning circuits 4X and 4Y scan a 64×64 conductor loop matrix. A $2^n$-bit counter 6a counts the number of sine waves of the carrier which is generated by the oscillator 50, while producing outputs $Q_i$ to $Q_{i+16}$. The lowest bit output $Q_i$ (signal produced by dividing the carrier frequency by 1/i) has a pulse width which is equal to the period $T_B$ (burst width) assigned to each conductor loop of the X-Y coordinates. The outputs $Q_{i+3}$, $Q_{i+4}$ and $Q_{i+5}$ are fed to a decimal decoder 6b. The repetition period of the output $Q_{i+6}$ is equal to the X-Y scanning period of the conductor loop groups.

The scanning circuits 4X and 4Y includes analog switches $X_1, \ldots, X_8$ ad $Y_1, \ldots, Y_8$. Each of these analog switches sequentially connects either conductor loops associated therewith to an output line 600 responsive to the control inputs $Q_i$, $Q_{i+1}$ and $Q_{i+2}$. Each of the AND gates $4X_1$-$4X_8$ ($4Y_1$-$4Y_8$) is adapted to provide a signal in response to an AND of the output $Q_{i+6}$ of the $2^n$-bit counter 6a and an output $C_0$, $C_1$, $C_2$, $C_3$, $C_4$, $C_5$, $C_6$, or $C_7$, so that the analog switches $X_1$-$X_8$ ($Y_1$-$Y_8$) are sequentially selected. The selected analog switch sequentially connects the conductor loops to the output line 600, one at a time, responsive to the control inputs $Q_1$, $Q_2$ and $Q_3$.

In the above construction, the 128 conductor loops in total which extend in the X and Y directions are sequentially connected to the output line 600 every time the output $Q_1$ appears, causing a signal a' (FIG. 15A) to flow through the output line 600.

Although not shown in the drawing, the controller 6 is constructed to generate a signal i which is representative of the origin of each axis (FIG. 6) timed to each positive-going edge and negative-going edge of the output $Q_{i+6}$, which are indicative of the beginnings of the X and Y scannings.

Figure 15A:
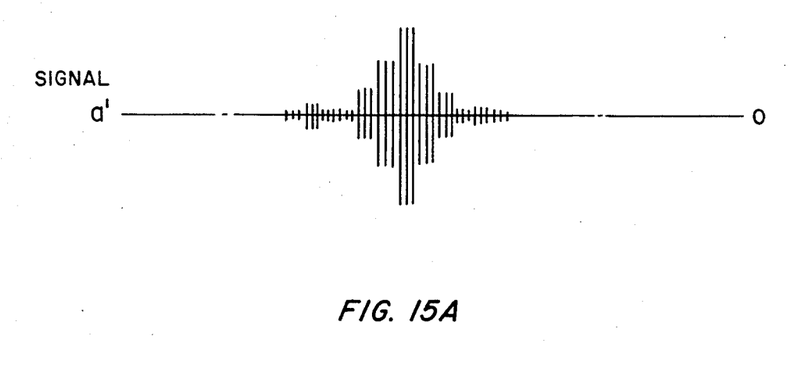
FIGS. 15A and 15B are timing charts, each demonstrating the operation of the device of FIG. 10.

As long as the stylus or pen 7 is touching the tablet 1 in a perpendicular position, the signal a' has a waveform as shown in FIG. 15A which is free from significant peaks except for the major or true peak, which peak is representative of the stylus or pen location.

Figure 13B:
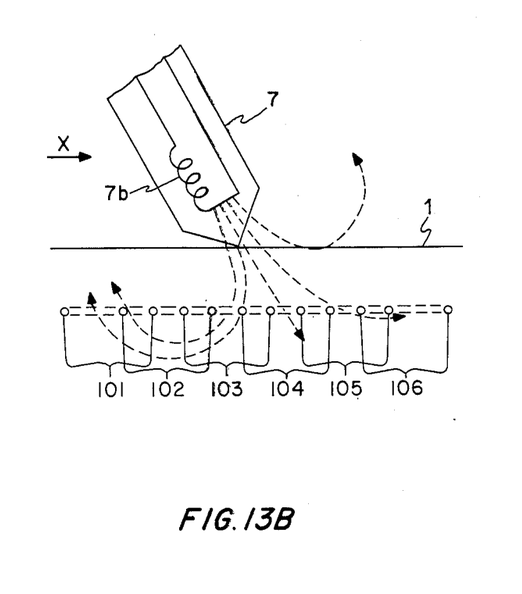

When the stylus or pen 7 is tilted as shown in FIG. 13B, an intense magnetic field interlinks those conductor loops toward which the stylus or pen 7 is tilted. As a result, a significant peak appears in the signal a' (FIG. 15B) in addition to the major peak, which is due to such an intense magnetic field.

Figure 15B:
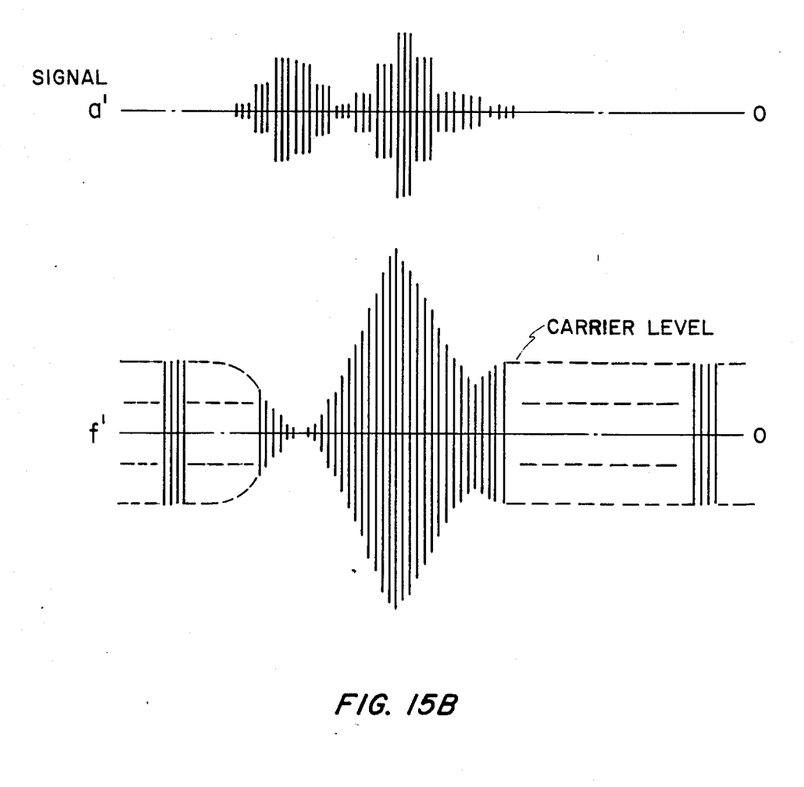

In this particular embodiment, the mixer 70 adds the signal a' to the carrier from the oscillator 50 to boost the major peaks of the signal a' and to attenuate the false peaks which are opposite in phase to the major peaks. This operation is also performed by the mixer 70 of FIG. 5. The output of the mixer 70 is routed to the detector 60. When propagated through the filter/amplifier 31 of the detector 60, the signal a' turns into a signal f', as shown in FIG. 15B, which corresponds to the signal f shown in FIG. 3. The signal f' is passed through the envelope detector 61, clipper 62 and peak detector 33 to become a signal h which is applied to the coordinates generator 8. Then, the coordinates generator 8 generates a digital signal having a value which is proportional to the interval between the pulse (signal h) from the detection circuit 60 and the pulse (signal i) from the controller 6 which is representative of the origin of each axis, the digital signal being fed out as a coordinates signal.

The graphic input device in accordance with the illustrative embodiment successfully eliminates peak detection errors even when the stylus or pen is held in a tilted writing position without resorting to a bulky and expensive synchronous detector and phase locking means, as in the previously discussed embodiment.

Figure 16:
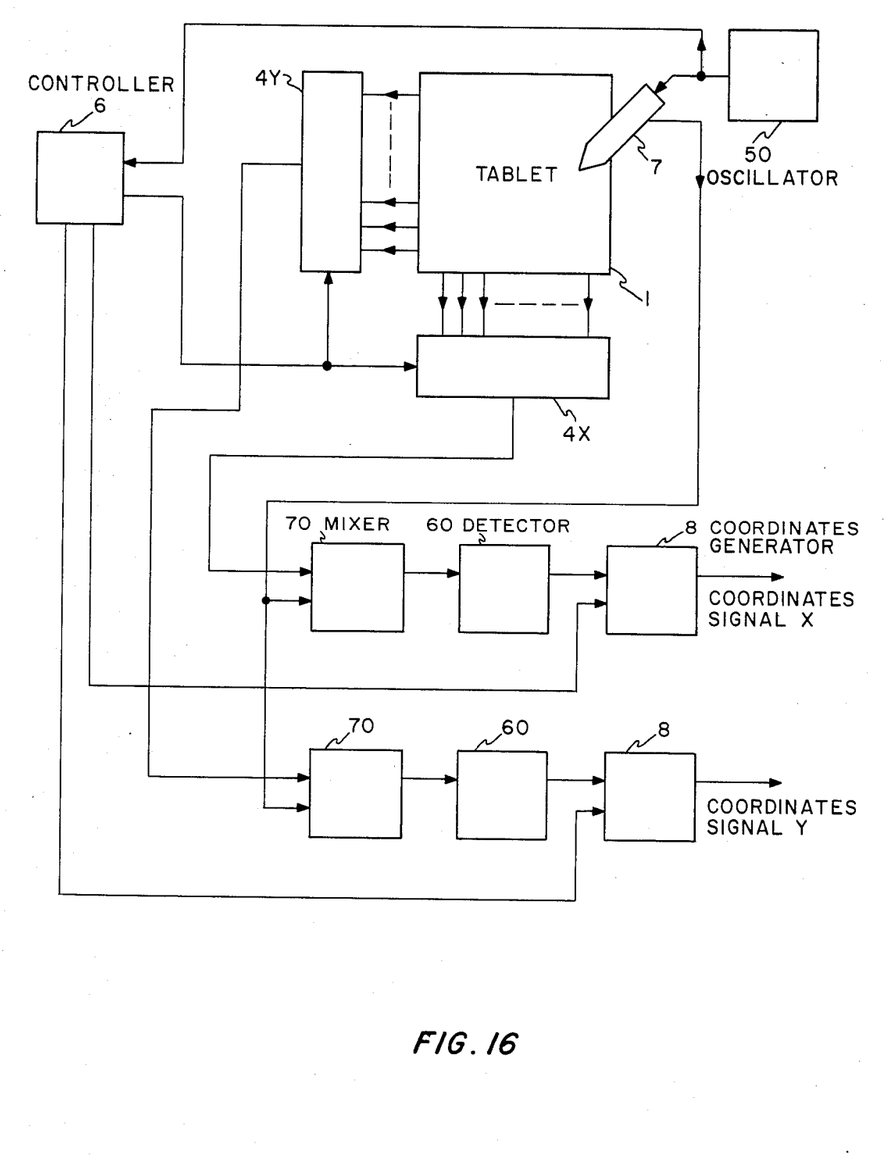
FIG. 16 is a block diagram of another embodiment of the present invention.

FIG. 16 shows still another embodiment of the invention which includes two independent mixers 70, 70. The mixers 70, 70 process the output signals of the scanning circuits 4X and 4Y in a parallel relationship to generate coordinates signals x and y, respectively. Each of the mixers 70, 70 adds the output signals of its associated scanning circuit 4X or 4Y to the carrier generated by the oscillator 50. The output of the mixer 70 is applied to the detection circuit 60. The detection circuit 60 generates a pulse, the positive-going edge of which is timed to the major peak. Circuit 60 delivers the pulse to the coordinates generator 8 to produce a coordinates signal x or y.

This embodiment, like the others described hereinbefore, frees the peak detection from errors even if the stylus or pen is tilted, without relying on a bulky and expensive construction. Another advantage attainable with this particular embodiment is that, since the scanning circuit 4X and 4Y operate at the same time, the frequency of coordinates signals generated per unit time is double the frequency of the previously stated embodiment.

In summary, it will be seen that the invention provides a graphic input device which extends the allowable range of pen or stylus inclinations despite its small-size and inexpensive construction. This advantage is derived from the addition of a small-scale circuit using an envelope detector which has a small circuit scale.

Those who are skilled in the art will readily perceive how to modify the invention. Therefore, the appended claims are to be construed to cover all equivalent structures which fall within the true scope and spirit of the invention.

What is claimed is:

1. A graphic input device having a tablet wherein two groups of conductor loops are arranged below an input surface, scanning circuit means for sequentially scanning each of the conductor loops, each loop being energized by a scanning signal which includes a carrier to generate a magnetic field which travels along an axis of coordinates on the input surface, and a stylus having a winding therein, whereby a first electrical signal is induced when the winding interlinks with the magnetic field at the time of data input onto the input surface, said graphic input device comprising:
   mixer means for mixing by addition the first electrical signal and the carrier;
   filter/amplifier means for passing and amplifying signal components of an output of said mixer means which lie in a predetermined bandwidth inclusive of a frequency of the carrier;
   detector means for envelope-detecting an output of said filter/amplifier means;
   peak detector means for clipping an output signal of said detector means and then detecting a peak of the clipped output signal to produce a second electrical signal which is representative of a time when the peak appears; and
   means for generating a coordinates signal which is indicative of coordinates of a location on said input surface of data input, said coordinates signal being generated responsive to a difference in time between the second electrical signal and a pulse signal which is representative of an origin of an axis of coordinates.

2. A graphic input device having a stylus containing a winding for developing a magnetic field responsive to a carrier applied to the winding, a tablet having two groups of conductor loops arranged below an input surface on said tablet, and scanning circuit means for scanning one of the two conductor loop groups and for delivering a first electrical signal which is induced in the conductor loop group responsive to the magnetic field of said stylus winding at the time of data input onto the input surface of said tablet, said graphic input device comprising:
   mixer means for mixing by addition the first electrical signal and the carrier;
   filter/amplifier means for passing and amplifying signal components of an output signal from said mixer means, said signal components lying in a predetermined bandwidth inclusive of a frequency of the carrier;
   detector means for envelope-detecting an output of said filter/amplifier means;
   peak detector means for detecting an output signal of said detector means and then detecting a peak that is clipped to produce a second electrical signal which is representative of a time when the peak appears; and
   means for generating a coordinates signal which is indicative of a location of data input on said tablet, said coordinates signal being generated responsive to a difference in time between the second electrical signal and a pulse signal which is representative of an origin of an axis of coordinates.

3. A graphic input device as claimed in claim 2, wherein the scanning circuit means simultaneously scan the two conductor loop groups to deliver first electrical signals which are induced in the conductor loop groups independently of each other.

4. A graphic input device as claimed in claim 3, wherein the mixer means comprises a pair of mixer means for respectively mixing by addition the first electrical signals and the carrier, the filter/amplifier means comprising a pair of filter/amplifier means, each of said filter/amplifier means passing and amplifying signal components of the first electrical signal which lie in a predetermined bandwidth inclusive of the frequency of the carrier, the detector means comprising a pair of detector means, each of said detector means envelope-detecting an output of any of said filter/amplifier means which is associated therewith, the peak detector means comprising a pair of peak detector means for clipping waveforms which are outputs of said detector means and then for detecting peaks of the clipped signals to produce respectively a third and a fourth electrical signal, whereby coordinates signals which are representative of coordinates of a location of data input are delivered responsive to a difference in time between the third and the fourth electrical signals and pulse signals that are representative of origins of coordinate axes.

5. A graphical input device comprising a tablet with a data entry surface having a plurality of incremental areas which are identified by conductor elements distributed adjacent the surface to identify coordinates of said surface on the tablet, said conductor elements being an orthogonal array of conductor loops, said loops being energized by a scanning signal including a carrier wave, means for providing an electromagnetic field including said carrier wave in said conductive elements, stylus means for picking up said field in said conductor elements when said stylus means is held on the surface of said tablet and is in the vicinity of said conductor elements, a signal resulting from said picked up field being subject to variations responsive to variations in an angle between said stylus and said surface, means for scanning said conductor elements to detect signals picked up by said stylus in terms of the coordinates of the conductor elements on said surface, and means for mixing the signals picked up responsive to said scanning means for balancing out the variations of said picked up signal which occurs as a result of said variation in said angle, said mixing means mixing by addition said carrier and the signal which is picked up responsive to said scanning means.

6. The device of claim 5 and filter/amplifier means responsive to said mixer means for passing and amplifying output signals from said mixer means.

7. The device of claim 6 and means responsive to said filter/amplifier means for envelope detecting an output of said filter/amplifier means.

8. The device of claim 7 and a differentiator means, a zero crossing detector means, and a two input AND gate, said detected envelope being applied to peak detector means comprising said differentiator means connected in series with said zero crossing detector, and one input of said AND gate, and an amplitude comparator means coupled to a second input of said AND gate, and means for simultaneously applying an input signal to an input of said differentiator means and to said amplitude comparator.

9. The device of claim 7 and means for clipping said detected envelope to generate a peak portion of said envelope which is above a voltage that is higher than the envelope of voltages representing the variations that are caused by different angles between said stylus and said surface.

10. The device of claim 7 and means responsive to said detected envelope for generating a pulse representative of the timing of said peak.

11. The device of claim 10 and means for generating a signal representing an origin of axes defining positions in said orthogonal array, and means jointly responsive to said signal of said origin and to said pulse for indicating the instantaneous coordinates of the location of said stylus on said tablet where said picking up of said signal occurs.

* * * * *